(12) United States Patent
Nissen et al.

(10) Patent No.: US 11,185,985 B2
(45) Date of Patent: Nov. 30, 2021

(54) INSPECTING COMPONENTS USING MOBILE ROBOTIC INSPECTION SYSTEMS

(71) Applicant: Bell Helicopter Textron Inc., Fort Worth, TX (US)

(72) Inventors: Jeffrey P. Nissen, Fort Worth, TX (US); Brian Cupples, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 749 days.

(21) Appl. No.: 14/589,562

(22) Filed: Jan. 5, 2015

(65) Prior Publication Data

US 2016/0195390 A1 Jul. 7, 2016

(51) Int. Cl.
*B25J 9/16* (2006.01)
*B25J 5/00* (2006.01)
(Continued)

(52) U.S. Cl.
CPC ............ *B25J 9/1679* (2013.01); *B25J 5/007* (2013.01); *B25J 9/1664* (2013.01); *B25J 9/1676* (2013.01);
(Continued)

(58) Field of Classification Search
CPC ...... B25J 9/1679; B25J 9/1676; B25J 9/1664; B25J 5/007; B25J 11/00; B25J 5/00; B25J 9/1692; Y10S 901/09; G01B 21/20; G01B 21/04; G06N 3/008; B62D 57/032; G01M 5/0075; B64F 5/60; B64F 5/30;
(Continued)

(56) References Cited

U.S. PATENT DOCUMENTS 4,536,690 A * 8/1985 Belsterling .......... B23Q 1/5462
318/687
4,838,696 A 6/1989 Pryor
(Continued)

OTHER PUBLICATIONS

Dictionary.com definition of "automatically"; searched on Jan. 5, 2019 (Year: 2019).*
(Continued)

*Primary Examiner* — Catherine T. Rastovski
*Assistant Examiner* — Leonard S Liang
(74) *Attorney, Agent, or Firm* — Daniel J. Chalker; Edwin S. Flores; Chalker Flores, LLP

(57) ABSTRACT

A method for mobile robotic based inspection includes delivery of inspection requirements identifying a part and one or more inspection mode types. A three-dimensional model of the part and one or more physical attributes or specifications of the aeronautical part are received. A plurality of different motion sequences for the robot inspection system are determined to evaluate a plurality of predefined points on the component using one or more sensors for the one or more inspection types. Data acquisition parameters are determined for inspection sequence to allow for collection of inspection data for one or more inspection modes. A motion sequence from the plurality of different motion sequences is selected based on one or more parameters. An optimized inspection program configured to update operating parameters of the robot inspection system to perform the selected motion sequence and capture data using the one or more sensors is generated.

20 Claims, 3 Drawing Sheets

(51) Int. Cl.
*B25J 11/00* (2006.01)
*B64F 5/60* (2017.01)
*B64C 39/02* (2006.01)

(52) U.S. Cl.
CPC .............. *B25J 11/00* (2013.01); *B25J 9/1671* (2013.01); *B25J 9/1674* (2013.01); *B25J 9/1697* (2013.01); *B64C 39/024* (2013.01); *B64F 5/60* (2017.01); *Y10S 901/09* (2013.01); *Y10S 901/44* (2013.01)

(58) Field of Classification Search
CPC ......... G05B 19/425; G01N 2291/2694; G01N 29/225; G01N 29/265; G01N 1/00; G01N 2201/00
See application file for complete search history.

(56) References Cited

U.S. PATENT DOCUMENTS

| | | | |
|---|---|---|---|
| 4,920,385 A | 4/1990 | Clarke et al. | |
| 5,416,321 A | 5/1995 | Sebastian et al. | |
| 5,726,917 A * | 3/1998 | Staaden | G05B 19/4103 33/503 |
| 5,737,500 A * | 4/1998 | Seraji | B25J 9/1643 318/568.11 |
| 5,908,458 A * | 6/1999 | Rowe | B25J 9/1658 701/50 |
| 6,158,136 A * | 12/2000 | Gotz | G01B 3/008 33/503 |
| 6,321,137 B1 * | 11/2001 | De Smet | B25J 9/1692 700/245 |
| 6,400,998 B1 * | 6/2002 | Yamazaki | G05B 19/401 318/568.1 |
| 6,463,360 B1 * | 10/2002 | Terada | G05B 19/41845 700/257 |
| 6,637,266 B1 | 10/2003 | Froom | |
| 6,907,317 B2 * | 6/2005 | Peshkin | B66D 3/20 318/628 |
| 6,907,799 B2 * | 6/2005 | Jacobsen | G01N 29/045 73/865.8 |
| 6,928,336 B2 * | 8/2005 | Peshkin | G05B 19/41815 700/245 |
| 7,395,606 B2 * | 7/2008 | Crampton | B25J 13/088 33/503 |
| 7,499,772 B2 * | 3/2009 | Wilcox | G01N 29/225 701/3 |
| 7,548,311 B2 * | 6/2009 | Knopp | G01J 3/02 356/301 |
| 7,748,900 B2 | 7/2010 | Maschke | |
| 7,765,032 B2 * | 7/2010 | Huston | H01F 7/04 700/258 |
| 7,784,348 B2 * | 8/2010 | Dubois | G01N 21/1702 73/620 |
| 8,126,598 B2 | 2/2012 | Mlaraswamy | |
| 8,225,667 B2 * | 7/2012 | Hanan | G01N 29/265 73/584 |
| 8,544,163 B2 * | 10/2013 | Sarh | B25J 9/0084 29/525.06 |
| 8,601,701 B2 * | 12/2013 | Wallace | G01B 21/042 33/503 |
| 8,812,154 B2 * | 8/2014 | Vian | G05D 1/0027 700/245 |
| 9,739,792 B2 * | 8/2017 | Atwood | E03F 7/12 |
| 2002/0120359 A1 * | 8/2002 | Xi | G05B 19/401 700/184 |
| 2003/0089183 A1 * | 5/2003 | Jacobsen | G01N 29/045 73/865.8 |
| 2005/0196543 A1 * | 9/2005 | Morton | B63B 59/00 427/421.1 |
| 2006/0170768 A1 * | 8/2006 | Riley | H04N 7/181 348/143 |
| 2006/0290779 A1 * | 12/2006 | Reverte | F16L 55/32 348/84 |
| 2007/0039390 A1 * | 2/2007 | Duncan | G01N 29/226 73/606 |
| 2008/0123809 A1 * | 5/2008 | Tudor | G01V 5/0083 378/57 |
| 2008/0125893 A1 * | 5/2008 | Tilove | B25J 9/1666 700/103 |
| 2008/0263628 A1 * | 10/2008 | Norman | H04L 63/0227 726/1 |
| 2009/0149119 A1 * | 6/2009 | Ahti | B24B 41/005 451/296 |
| 2009/0166102 A1 * | 7/2009 | Waibel | B63B 59/10 180/7.1 |
| 2010/0218624 A1 * | 9/2010 | Atwood | B62D 55/12 73/865.8 |
| 2011/0073386 A1 * | 3/2011 | Provancher | B62D 57/024 180/7.1 |
| 2011/0192042 A1 * | 8/2011 | McMurtry | G01B 21/042 33/503 |
| 2012/0053684 A1 * | 3/2012 | Righini | A61F 2/243 623/2.11 |
| 2012/0072053 A1 * | 3/2012 | Zesch | G21C 17/013 701/2 |
| 2012/0185091 A1 * | 7/2012 | Field | G05D 1/0044 700/254 |
| 2012/0185115 A1 * | 7/2012 | Dean | F41H 7/005 701/2 |
| 2012/0209415 A1 * | 8/2012 | Casanelles | B25J 19/06 700/109 |
| 2012/0215352 A1 * | 8/2012 | Eberst | B25J 9/1664 700/253 |
| 2013/0042706 A1 * | 2/2013 | Phillips | G01R 31/1245 73/865.8 |
| 2013/0114861 A1 * | 5/2013 | Takizawa | G06T 7/004 382/106 |
| 2013/0231779 A1 * | 9/2013 | Purkayastha | B25J 9/1697 700/259 |
| 2013/0238128 A1 * | 9/2013 | Suzuki | B25J 9/1669 700/258 |
| 2013/0268118 A1 * | 10/2013 | Grinstead | B25J 19/023 700/259 |
| 2014/0081504 A1 * | 3/2014 | Smith | B63B 17/00 701/23 |
| 2014/0146161 A1 * | 5/2014 | Sibai | B62D 57/028 348/84 |
| 2015/0094851 A1 * | 4/2015 | Kawabe | B25J 11/0005 700/246 |
| 2015/0190925 A1 * | 7/2015 | Hoffman | B25J 9/161 700/257 |
| 2015/0329221 A1 * | 11/2015 | Georgeson | G01N 29/0654 702/36 |
| 2015/0336270 A1 * | 11/2015 | Storr | B25J 9/1674 700/245 |
| 2015/0367516 A1 * | 12/2015 | Sarh | B25J 9/0042 700/259 |
| 2016/0016312 A1 * | 1/2016 | Lawrence, III | G01N 21/9515 700/98 |
| 2016/0059416 A1 * | 3/2016 | Tian | B25J 9/1666 700/253 |
| 2016/0075020 A1 * | 3/2016 | Szarski | B25J 9/1664 700/160 |

OTHER PUBLICATIONS

Merriam-Webster Definition of "automatic" (Year: 2019).*
Dictionary.com definition of "autonomous"—https://www.dictionary.com/browse/autonomous (Year: 2020).*

* cited by examiner

INSPECTING COMPONENTS USING MOBILE ROBOTIC INSPECTION SYSTEMS

TECHNICAL FIELD

This disclosure relates to inspecting components using mobile robotic inspection systems.

BACKGROUND

Non-destructive inspection (NDI) is a wide group of analysis techniques used in industry to evaluate the properties of components without causing damage. Common NDI methods include component check fixtures in which components are placed into to verify integrity, inspection by coordinate measurement machine (CMM), manual inspection by a human including visual or with hand tools, ultrasonic, radiographic, shearographic, thermographic, nital etch, magnetic particle, liquid penetrant, and others. These inspection processes require varying levels of operator involvement, from completely manual as during human manual inspection to partially automated (e.g., CMM inspection). Current manufacturing flow requires parts to be moved to inspection stations throughout the manufacturing process, and current inspection processes require significant operator programming for partially automated systems and can be time consuming to perform.

SUMMARY

A method for robotic based inspection includes receiving inspection requirements, identifying a part, and one or more inspection mode types. A three-dimensional model of the part and one or more physical attributes or specifications of the aeronautical part are received. A plurality of different motion sequences for the robot inspection system are determined to evaluate a plurality of predefined points on the component using one or more sensors for the one or more inspection types. Data acquisition parameters are determined for the inspection sequence to allow for collection of inspection data for one or more inspection modes. A optimized motion sequence from the plurality of different motion sequences is selected based on one or more parameters. An inspection program configured to update operating parameters of the robot inspection system to perform the selected motion sequence and capture data using the one or more sensors is generated.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
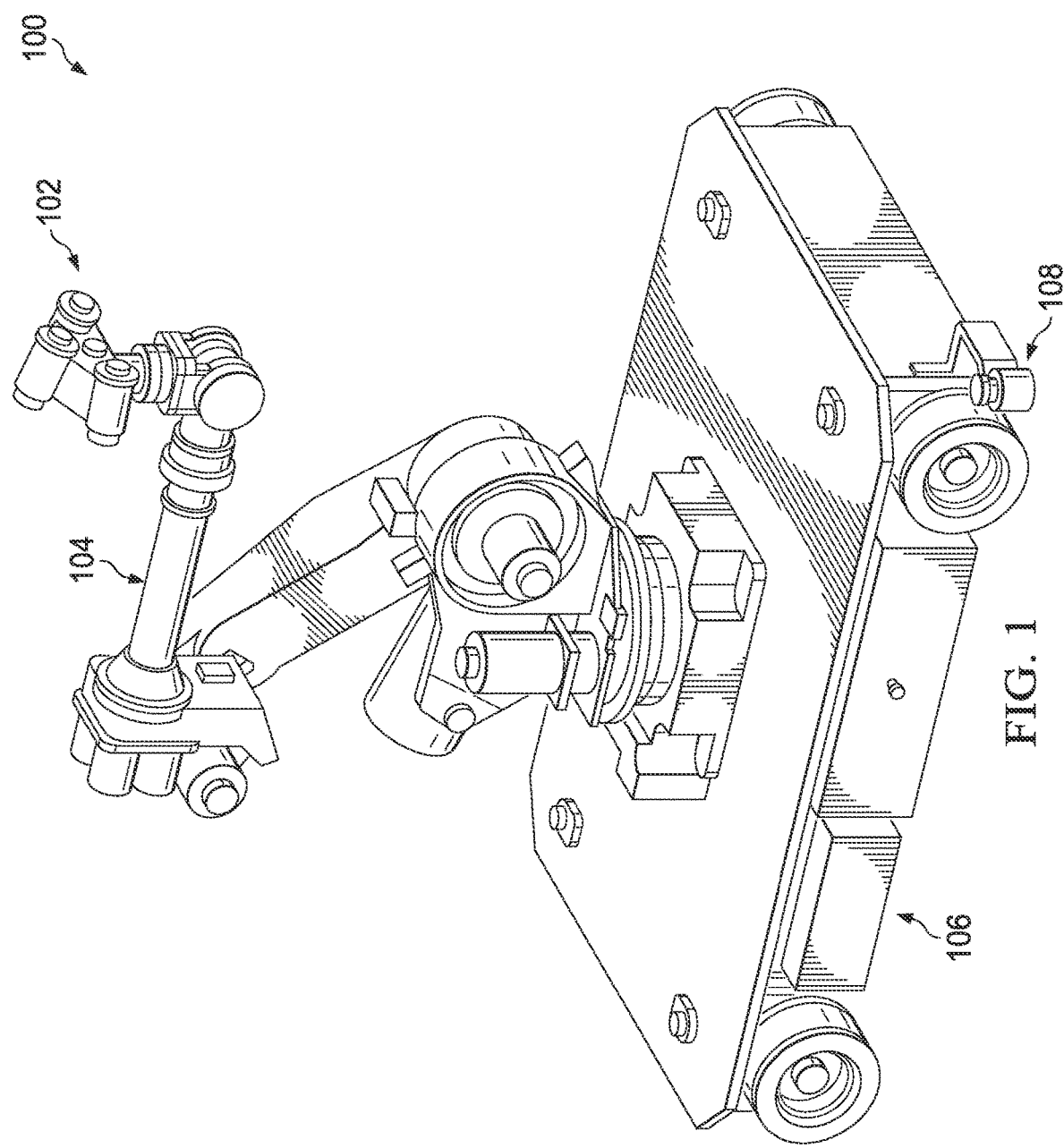
FIG. 1 is an example mobile robotic inspection system.

The disclosure is directed to generating an inspection program for a mobile robotic inspection. For example, a program for automatically inspecting a component can be generated using a component digital model and a selected type of inspection. In these instances, the program generates commands that move a mobile robotic inspection system through a manufacturing factory to a component, and the mobile robotic inspection system moves one or more sensors to a plurality of predefined points at least proximate the component. In general, the implementations described below may include one or more of the following: automatic pre-processing and robotic programming; mobile platform sensing and positioning; robotic arm positioning; inspection data collection and amalgamation; inspection data validation; and archival software.

During automatic pre-processing and robotic programming, the operator may load a component digital model and select a type of inspection to be performed. For example, the component digital model can be a computer-aided design (CAD) drawing identifying dimensions of a component as well as physical properties. In response to receiving the component digital model and the selection, the model geometry is analyzed against chosen inspection parameters to determine a suitable robotic arm and a mobile base position to provide adequate component coverage during inspection. Once selected, a plurality of different motion sequences is determined for the robot inspection system for a plurality of predefined points on the component. For example, motion sequences of a robotic arm including a sensor may be determined for a plurality of predefined points. In some implementations, a motion sequence from the plurality of different motion sequences may be selected based on one or more parameters (e.g., inspection duration). In addition, data acquisition parameters and robotic system input and output parameters may be determined. Based on the selected motion sequence and parameters, an inspection program may be generated that updates operating parameters of the mobile robotic inspection system to perform the selected motion sequence and capture data using the one or more sensors. This inspection program is then automatically sent to the mobile robotic inspection system. By enabling automatic generation of the inspection program, a robotic inspection system can be efficiently and rapidly programmed.

Once the mobile robotic inspection system receives the inspection program, the mobile robotic inspection system may compare its current position and to a first desired position. Once the locations are determined, the mobile robotic inspection system may move to the new position by, for example, calculation of a movement vector. As a result, the mobile robotic inspection system may move through a manufacturing factory to each location without having to move the component to the inspection device. Once in position, the mobile robotic inspection system may calibrate the selected inspection technology and begin executing the robotic motion and inspection program.

Once the inspection data has been completed for an initial position, the mobile robotic inspection system may then move to additional positions as defined by the inspection program. Upon completion of inspection data collection, the mobile robotic inspection system may validate the collected data against the inspection requirement. In some implementations, the data is then decimated to allow for efficient storage and archival. Following conclusion of the inspection activity, the mobile robotic inspection system may then return to a home position using its positioning system.

FIG. 1 illustrates an example mobile robotic inspection system 100 for inspecting stationary components to identify defects and anomalies. For example, the mobile robotic inspection system 100 may navigate or otherwise move through a manufacturing factory to a component and execute an inspection process to evaluate the component. As illustrated, the mobile robotic inspection system 100 includes an inspection device 102, a robotic arm 104, a mobile platform 106, and a monitoring system 108. The inspection device 102 is mounted on the robotic arm 104, and the robotic arm 104 is mounted on the mobile platform 106. The mobile platform 106 is configured to navigate through a manufacturing facility to a position proximate a component, and the robotic arm 104 is configured to move the inspection device 102 to predefined position at least proximate the component. The inspection device 102 is configured to detect signals at each of the predefined positions.

In particular, the inspection device 102 can include any software, hardware, firmware, or a combination thereof configured to detect signals associated with a component. For example, the inspection device 102 may capture images such as visible light images, x-ray images, or others. The inspection device 102 may include one or more inspection technologies such as machine vision, optical metrology, white light metrology, laser scan inspection, ultrasonic, radiographic, shearographic, thermographic, or spectroscopic such as FTIR (fourier transform infrared) or Raman. In some implementations, the inspection device 102 may include both an emitter and a sensor. In these instances, the inspection device 102 may direct signals at a component and detect signals associated with the emission. In some implementations, the inspection device 102 is removable, which enables it to be replaced with other types of inspection devices.

The robotic arm 104 can include any software, hardware, firmware, or a combination thereof configured to move in multiple axes or degrees of freedom. As illustrated, the robotic arm 104 includes links connected by joints that enable rotational motion or translational displacement. In the illustrated implementation, the robotic arm 104 enables motion in 6 axes such as X, Y, Z, pitch, yaw, and roll. Using these multiple axes, the robotic arm 104 can be configured to move the inspection device 102 to multiple predefined positions at least proximate a component.

The mobile platform 106 can include any software, hardware, firmware, or a combination thereof configured to navigate or otherwise move through a facility (e.g., manufacturing facility). The mobile platform 106 may determine locations using positing data such as radio frequency identifier (RFID) signals, global positioning system (GPS), indoor GPS, photogrammetry, laser tracking, optical CMM, or others. In some instances, the mobile platform 106 is an omni-directional platform allowing for motion in any direction. In some implementations, the mobile platform 106 includes a positioning and safety monitoring system 108 configured to monitor the environment. In some examples, the positioning and safety monitoring system 108 may be configured to scan (e.g., continuously scan) the working envelope to monitor for human movement or obstructions. In some examples, the positioning and safety monitoring system 108 may be configured to provide position feedback.

In some aspects of operations, the mobile robotic inspection system 100 receives an inspection program configured to generate commands to execute the inspection process. The mobile robotic inspection system 100 may receive the inspection program through a wired or wireless connection. When executed, the mobile robotic inspection system 100 may determine a current location and a destination, and the mobile platform 106 navigates to the position proximate a component designated for inspection. While moving through a facility, the positioning and safety monitoring system 108 may provide position feedback and monitor for human activity or obstructions. Once in position, the inspection device 102 may be calibrated. When the inspection device 102 is activated, the inspection program issues commands to move the robotic arm 104 through a sequences of motion to position the inspection device 102 in predefined positions. At each position, the inspection device 102 captures signals associated with the inspection process. After inspection data acquisition, the mobile robotic inspection system 100 may execute inspection requirement validation, export, and archival of datasets.

Figure 2:
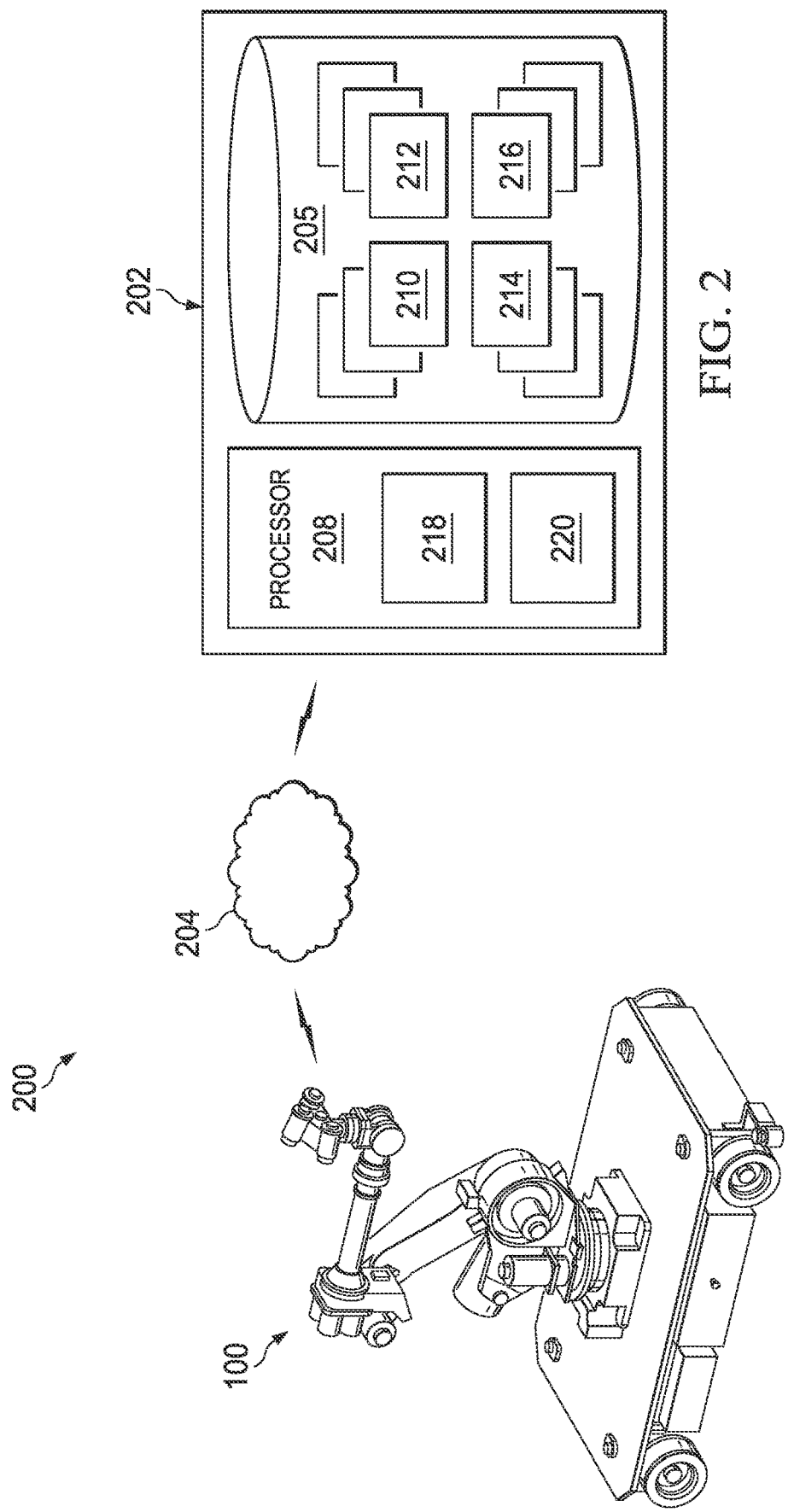
FIG. 2 is an example system for generating inspection programs.

FIG. 2 is an example inspection system 200 configured to automatically generate an inspection program for the mobile robotic inspection system 100. For example, the inspection system 200 may receive a selection of a component designated for an inspection and an inspection type and automatically generated an inspection program based on one or more parameters. In these instances, the inspection system 200 may determine a sequence of motions for predefined positions that results in the shortest inspection duration. The inspection system 100 may optimize or otherwise enhance the inspection based on other parameters such as power consumption, a number of movements, risk to safety or human crashing likelihood, data collection rate per minute, computational resources and duration required, or others. In some implementations, the inspection system 200 may provide one or more of the following: automatic generation and/or update of inspection robot programs; system autonomy; multi-modal data merge; validation of inspection requirements; and others.

In regard to inspection programs, the inspection system 200 can, in some implementations, use inspection optimization parameters and component geometry to develop a robot path with the least amount of motion between points. In regards to autonomy, the mobile robotic inspection system 100 includes, in some implementations, sensors and receivers to remain autonomous in the manufacturing factory, which includes receiving wireless signals for allowing inspections to occur, automatic programming, self-drive capability with obstacle avoidance, inspection setup, inspection execution, and data transmissions. In regards to multimodal data merge, the inspection system 200 can, in some implementations, merge different types of data to generate a decision or result of greater value than individual datasets. In some examples, a color photo capture of a surface can be combined with white light inspection which is projected onto a component model. In some examples, computed tomography x-ray and white light dimensional data are combined into a component mode to allow for a high accuracy component inspection and troubleshooting. In regards to validation, the inspection system 200 may perform automatic validation of inspection requirements using component geometry and model based data.

As illustrated, the inspection system 200 includes a control computer 202 communicably coupled to the mobile robotic inspection system 100 through a network 204. The control computer 202 includes memory 205 and a processor 208. The memory 205 stores models 210 for components, operating parameters 212 for different sensors, inspection programs 214, and reports 216 for performed inspections. The processor 208 includes a programming module 218 for automatically generating inspection programs and a validation module 220 for validating the results. At a high level, the programming module 218 receives a selection of a component and an inspection type and selects a corresponding model 210 for the component and operating parameters 212 for the inspection type. The programming module 218 evaluates sequences of motions based on the component geometry identified in the model 210 and selects a sequence of motions based on, for example, inspection duration. Once selected, the programming module 218 automatically generates an inspection program 214 based on the selected sequence of motions and the operating parameters 212. The programming module 218 transmits the inspection program 214 to the mobile robotic inspection system 100 through the network 204. Once the inspection is completed, the mobile robotic inspection system 100 transmits the inspection data to the validation module 220. The validation module 220 evaluates the inspection data based on the corresponding model 210.

As for a more detailed description of the illustrated implementation, the control computer 202 includes memory 205 and the processor 208 and comprises an electronic computing device operable to receive, transmit, process and store data associated with system 200. For example, the control computer 202 may be any computer or processing device such as a mainframe, a blade server, general-purpose personal computer (PC), Macintosh, workstation, Unix-based computer, or any other suitable device. Generally, FIG. 2 provides merely one example of a computer that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 2 illustrates one control computer 202 that may be used with the disclosure, system 200 can be implemented using a pool of computers.

Memory 205 may include any memory or database module and may take the form of volatile or non-volatile memory including magnetic media, optical media, Random Access Memory (RAM), Read Only Memory (ROM), removable media, or any other suitable local or remote memory component. In the illustrated implementation, memory 205 includes models 210 for components, operating parameters 212 for different sensors, inspection programs 214, and reports 216 for performed inspections. Models 210 include one or more entries or data structures that identify component geometry and associated properties. For example, the model 210 may include or otherwise identify a CAD drawing including dimensions for a component and physical properties of the component. In some implementations, the model 210 for a component may include one or more of the following: dimensions; material; a part number; a class; predefined points on the component; one or more physical attributes or specifications for the predefined points; expected inspection duration or completion; and others. In some implementations, the one or more physical attributes may identify ranges for properties, tolerances, or other attributes. For example, a physical attribute may identify a range for inspection data for a predefined point. A specification attribute may identify a requirement to utilize a particular inspection modality.

Operating parameters 212 include any parameters, variables, algorithms, instructions, rules, objects or other directives for operating inspection devices. For example, the operating parameter 212 may identify an exposure time for a sensor and operating voltages. In some implementations, the operating parameter 212 may include or otherwise identify one or more of the following: inspection type; one or more operating voltages; a time period for detection; a time period for emission; an emission intensity; optimal inspection device pose and coverage area; inspection device kinematic requirements such as inertia and motion speed limitation.

Inspection program 114 is any application, program, module, process, or other software that may generate commands to execute an inspection of an associated component using the mobile robotic inspection system 100. For example, the inspection program 114 may generate commands to control the robotic arm 104 through a sequence of motions or paths and stopping at predefined points for specified periods. In addition, the inspection program 114 may generate commands to operate the inspection device 102 in accordance with associated operating parameters 212. For example, the inspection program 114 may generate commands to illuminate a surface for a period of time at a specified intensity and capture images during the illumination. In short, the inspection program 114 can generate commands to control an emission source and/or a sensor.

Reports 216 include one or more entries or data structures that identify information associated with inspection data of components. For example, the report 216 may identify a component has any defects and faults such as cracks, disbonds, discontinuities, voids, porosity, or others. In some implementations, the report 216 may include one or more of the following: part number; component name; inspection date and time; predefined points; inspection data for each of the predefined points; validation result; defect types; inspection modalities utilized; system performance assessment such a as total duration and work efficiency; and others. In addition, the report 216 may include information identifying actions that a user of control computer 202 may perform in response to address faults and anomalies. For example, the report 216 may include instructions for performing remedial measures on the component.

The control computer 202 also includes the processor 208. Processor 208 executes instructions and manipulates data to perform the operations of the control computer 202 such as, for example, a central processing unit (CPU), a blade, an application specific integrated circuit (ASIC), or a field-programmable gate array (FPGA). Although FIG. 2 illustrates a single processor 208 in the control computer 202, multiple processors 208 may be used according to particular needs and reference to the processor 208 is meant to include multiple processors 208 where applicable. As illustrated, the processor 208 includes the programming module 218 and the validation module 220.

The programming module 218 can include any software, hardware, firmware, or combination thereof to automatically generate inspection programs 214. For example, the programming module 218 may receive a selection of a component and inspection type and generate an inspection program 214 based on a model 210 for the selected component and operating parameters 212 for the inspection device 102. In some implementations, the programming module 218 may present a list of components available for inspection. In response to a selection, the programming module 218 may identify a model 210 for the selected component and present a list of inspection types available for the component. Based on the selected inspection type and the component, the programming module 218 may determine an appropriate mobile robotic inspection system 100. For example, the programming module 218 may determine an appropriate length for a robotic arm based on the component geometry. Once a mobile robotic inspection system 100 is selected, the programming module 218 can determine sequences of motions between predefined points based on the component geometry and geometry and axes of the robotic arm 104. During this processes, the programming module 218 may eliminate sequences of motions that result in collisions with the component, component support, the mobile robotic inspection system 100, or other elements in the environment. From the remaining sequences of motions, the programming module 218 selects one sequence of motions based on one or more parameters. For example, the programming module 218 may select the sequence of motion with the smallest inspection duration or lowest power consumption. Once selected, the programming module 218 generates an inspection program 214 configured to generate commands that move the robotic arm 104 through the selected sequence of motion and applies associated operating parameters to the inspection device 102. The programming module 218 transmits the inspection program 214 to the mobile robotic inspection system 100 through the network 204.

The validation module 220 can include any software, hardware, firmware, or combination thereof configured to generate reports 216 based on inspection data. For example, the validation module 220 may receive inspection data from the mobile robotic inspection system 100 and determine whether the component has any defects or anomalies. In response to receiving inspection data, the validation module 220 may retrieve physical attributes from the associated model 210. For example, the associated model 210 may identify ranges for different inspection types at different points. In these instances, the validation module 220 may determine whether the inspection data for the predefined points falls within the identified ranges. Based on these comparisons, the validation module 220 generates a report 216 and archives the inspection data.

Network 204 facilitates wireless or wireline communication between the control computer 202 and the mobile robotic inspection system 100. Network 204 may communicate, for example, Internet Protocol (IP) packets, Frame Relay frames, Asynchronous Transfer Mode (ATM) cells, voice, video, data, and other suitable information between network addresses. Network 204 may include one or more local area networks (LANs), radio access networks (RANs), metropolitan area networks (MANs), wide area networks (WANs), all or a portion of the global computer network known as the Internet, and/or any other communication system or systems at one or more locations. As appropriate, the control computer 202 generates requests and/or responses and communicates them to another client, user, server, or other computer systems located in or beyond network 204. For example, the control computer 202 may receive inspection data associated with components.

Figure 3:
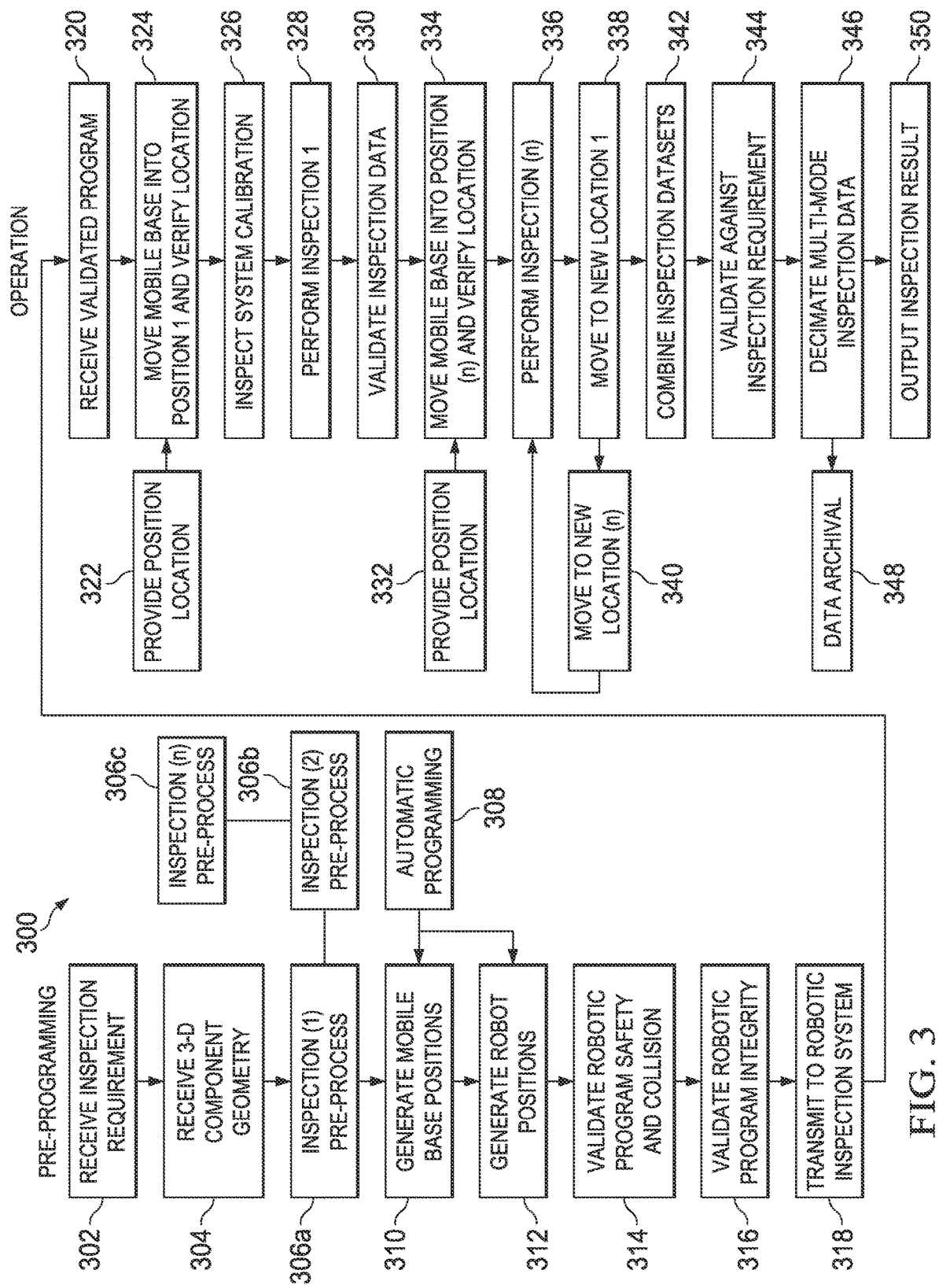
FIG. 3 is a flowchart illustrating an example method for performing an inspection.

FIG. 3 is a flowchart illustrating an example method 300 for generating and executing an inspection program and evaluating associated results. Method 300 is described with respect to system 100 of FIG. 1 and system 200 of FIG. 2. Though, systems 100 and 200 contemplate using or implementing any suitable technique for performing these and other tasks. Method 300 is for illustration purposes only and that the described or similar techniques may be performed at any appropriate time, including concurrently, individually, or in combination. In addition, many of the steps in these flowcharts may take place simultaneously and/or in different orders than as shown. Moreover, systems 100 and 200 may use methods with additional steps, fewer steps, and/or different steps, so long as the methods remain appropriate.

Method 300 includes two processes: (1) a pre-programming process at steps 302-318; and (2) an operation process at steps 320-350. The pre-programming process begins at step 302 where an inspection requirement is received. For example, the control computer 202 of FIG. 2 may receive a request identifying a component and an inspection type. In some instances, the request may include at least one of a part number, a class, a location, or a type of inspection. Next, at step 304, 3-D component geometry is received. In the example, the programming module 218 determines a model 210 for the component and retrieves the component geometry from the model 210. At steps 306a-c, the inspection pre-process determines parameters for the inspection. Returning to the example, the programming module 218 may determine operating parameters for the inspection device 102 using the operating parameters 212 associated with the inspection type. At step 308, the automatic programming is performed including generating mobile base positions at step 310 and robot positions at step 312. In the example, the programming module 218 may determine a current location of the mobile robotic inspection system 100, the location of the component, and route between the locations. In addition, the programming module 218 determines robot positions to move through sequences of motions and selects a sequence of motion based on one or more parameters (e.g., inspection duration). Next, at step 314, the robotic program is validated for safety and collision. As for the example, the programming module 218 may simulate the routing between locations of the mobile robotic inspection system 100 and the sequence of motion of the robotic arm 102 to determine whether a collision will occur with, for example, a cable, tool, part, a human, or other item. If a collision does not occur, the robotic program integrity is validated at step 316. At step 318, the inspection program is transmitted to the robotic inspection system. In the example, the control computer 202 transmits the inspection program 214 to the mobile robotic inspection system 100 through the network 204.

Turning to the operation process, the validated program is received at step 320. Returning to the example, the mobile robotic inspection system 100 receives the validated inspection program 214. The position location of the component is provided at step 322, and the mobile base is moved into position 1 at step 324. In the example, the mobile robotic inspection system 100 receives the component location and moves through the manufacturing facility to a location proximate the component. In some instances, the mobile robotic inspection system 100 may verify the location after arriving at the destination. At step 326, the inspection system is calibrated at step 326. As for the example, the mobile robotic inspection system 100 may calibrate the inspection device 102. Next, at step 328, the first inspection is performed. In the example, the robotic arm 102 may move the inspection device 102 to predefined points at least proximate the component and enable the inspection device 102 to capture signals. At step 330, the inspection data is validated. In the example, the mobile robotic inspection system 100 may determine whether the inspection data includes any errors or anomalies. A new position is provided at step 332, and the mobile base is moved to that position at step 334. Returning to the example, the mobile robotic inspection system 100 may navigate between two points in the manufacturing facility without returning to a base station. In doing so, the mobile robotic inspection system 100 may move directly between different components. The inspection is performed on the new component at step 336. If additional components need to be inspected, then a new location is provided and the mobile base is moved to that new location at steps 338 and 340. At step 342, the inspection data sets are combined. Returning to the example, the validation module 220 may combine the inspection data with the 3-D model from the model 210 for the associated component. For example, the validation module 220 may overlay a photo onto the 3-D model. Next, at step 344, the inspection data is validated against the inspection requirement. In the example, the validation module 220 may determine whether inspection data has been collected for each of the requested inspections. The multi-mode inspection data is decimated at step 346 and then archived at step 348. The inspection results are outputted at step 350. As for the example, the validation module 220 may sample the inspection data and generate the result 216 based on the sampled data.

A number of implementations of the invention have been described. Nevertheless, it will be understood that various modifications may be made without departing from the spirit and scope of the invention. Accordingly, other implementations are within the scope of the following claims.

What is claimed is:

1. A method for robotic based inspection, comprising:
    receiving inspection requirements identifying a component and one or more inspection mode types at a control computer;
    receiving a three-dimensional model of the component and one or more physical attributes of the component at the control computer;
    automatically determining a plurality of different motion sequences for the robotic inspection system by a programming module of the control computer to evaluate a plurality of predefined points on the component using one or more sensors for the one or more inspection types;
    determining data acquisition parameters for inspection sequence using the control computer to allow for collection of inspection data for one or more inspection modes;
    selecting a motion sequence from the plurality of different motion sequences based on one or more parameters using the control computer;
    automatically generating an inspection program using the programming module of the control computer without operator programming, the inspection program configured to update operating parameters of the robotic inspection system to perform the selected motion sequence and capture data using the one or more sensors;
    validating the inspection program to ensure safe operation of the robotic inspection system by the control computer;
    automatically transmitting the entire inspection program from the control computer to the robotic inspection system prior to execution of the inspection program by the robotic inspection system;
    after receiving the entire inspection program, executing the inspection program by the robotic inspection system, the inspection program generating commands to automatically inspect the component by causing the robotic inspection system to perform the selected motion sequence, and capture the data using the one or more sensors; and
    upon completion of the inspection by the robotic inspection system, transmitting the captured data from the robotic inspection system to the control computer.

2. The method of claim 1, further comprising determining robotic system input and output parameters during inspection data acquisition.

3. The method of claim 1, wherein the inspection requirements identify at least one of a part number, a class, or a location.

4. The method of claim 1, further comprising determining a location of the component relative to the robotic inspection system, wherein the program is further configured to update operating parameters to navigate the robotic inspection system to a location proximate the component.

5. The method of claim 1, further comprising:
    evaluating the captured data based on the one or more physical attributes of the component using the control computer after the captured data is received.

6. The method of claim 1, further comprising:
    determining a violation of the one or more physical attributes; and in response to the violation, generating a notification.

7. The method of claim 1, wherein the one or more sensors utilizes at least one of machine vision, optical metrology, laser based inspection, ultrasonic, radiographic, shearographic, thermographic, or spectrographic methods.

8. The method of claim 1, wherein validating the inspection program to ensure safe operation of the robotic inspection system by the control computer comprises:
    automatically determining a first subset of the plurality of different motion sequences results in a physical or human collisions; and
    automatically discarding the first subset from the plurality of different motion sequences to generate a second subset, wherein the motion sequence is selected from the second subset.

9. The method of claim 1, wherein the three-dimensional model comprises a computer-aided design (CAD) drawing of the component.

10. The method of claim 1, further comprising validating the captured data against the inspection requirements to determine whether the captured data has been collected for all of the inspection requirements.

11. A non-transitory computer readable medium storing instructions to cause a processor of a control computer and a processor of a robotic inspection system to perform operations comprising:
    receiving inspection requirements identifying a component and one or more inspection mode types by the processor of the control computer;
    receiving a three-dimensional model of the component and one or more physical attributes of the component by the processor of the control computer;
    automatically determining a plurality of different motion sequences for the robotic inspection system by a programming module of the control computer to evaluate a plurality of predefined points on the component using one or more sensors for the one or more inspection types;
    determining data acquisition parameters for inspection sequence by the processor of the control computer to allow for collection of inspection data for one or more inspection modes;
    selecting a motion sequence from the plurality of different motion sequences based on one or more parameters by the processor of the control computer;
    automatically generating an inspection program by a programming module of the control computer without operator programming, the inspection program configured to update operating parameters of the robotic inspection system to perform the selected motion sequence and capture data using the one or more sensors;
    validating the inspection program to ensure safe operation of the robotic inspection system by the processor of the control computer;

automatically transmitting the entire inspection program from the control computer to the robotic inspection system prior to execution of the inspection program by the robotic inspection system;

after receiving the entire inspection program, executing the inspection program by the processor of the robotic inspection system, the inspection program generating commands to automatically inspect the component by causing the robotic inspection system to perform the selected motion sequence and capture the data using the one or more sensors; and upon completion of the inspection by the robotic inspection system, transmitting the captured data from the robotic inspection system to the control computer.

12. The computer readable medium of claim 11, the instructions further comprising determining robotic system input and output parameters during inspection data acquisition.

13. The computer readable medium of claim 11, wherein the inspection requirements identify at least one of a part number, a class, or a location.

14. The computer readable medium of claim 11, the instructions further comprising determining a location of the component relative to the robotic inspection system, wherein the program is further configured to update operating parameters to navigate the robotic inspection system to a location proximate the component.

15. The computer readable medium of claim 11, the instructions further comprising:

evaluating the captured data based on the one or more physical attributes of the component using the control computer after the captured data is received.

16. The computer readable medium of claim 11, the instructions further comprising:

determining a violation of the one or more physical attributes; and in response to the violation, generating a notification.

17. The computer readable medium of claim 11, wherein the one or more sensors utilizes at least one of machine vision, optical metrology, laser based inspection, ultrasonic, radiographic, shearographic, thermographic, or spectrographic methods.

18. The computer readable medium of claim 11, the instructions further comprising wherein validating the inspection program to ensure safe operation of the robotic inspection system by the processor of the control computer comprises:

automatically determining a first subset of the plurality of different motion sequences results in a physical or human collisions; and automatically discarding the first subset from the plurality of different motion sequences to generate a second subset, wherein the motion sequence is selected from the second subset.

19. The computer readable medium of claim 11, wherein the three-dimensional model comprises a computer-aided design (CAD) drawing of the component.

20. The computer readable medium of claim 11, the instructions further comprising validating the captured data against the inspection requirements to determine whether the captured data has been collected for all of the inspection requirements.

* * * * *